(12) United States Patent
Lang et al.

(10) Patent No.: US 10,944,874 B2
(45) Date of Patent: Mar. 9, 2021

(54) TELECOMMUNICATION SYSTEM FOR MONITORING AND CONTROLLING OF A NETWORK PROVIDING RESOURCE TO A USER

(71) Applicant: SAP SE, Walldorf (DE)

(72) Inventors: Georg Lang, Walldorf (DE); Artur Kaufmann, Walldorf (DE); Adrian Golec, Walldorf (DE)

(73) Assignee: SAP SE, Walldorf (DE)

( * ) Notice: Subject to any disclaimer, the term of this patent is extended or adjusted under 35 U.S.C. 154(b) by 1135 days.

(21) Appl. No.: 15/364,290

(22) Filed: Nov. 30, 2016

(65) Prior Publication Data

US 2018/0152564 A1    May 31, 2018

(51) Int. Cl.
*G06Q 30/00* (2012.01)
*H04M 15/00* (2006.01)
(Continued)

(52) U.S. Cl.
CPC ............ *H04M 15/61* (2013.01); *G06Q 30/04* (2013.01); *G06Q 40/12* (2013.12); *H04M 15/00* (2013.01); *H04M 15/41* (2013.01); *H04M 15/44* (2013.01); *H04M 15/53* (2013.01); *H04M 15/68* (2013.01); *H04M 15/70* (2013.01); *H04M 15/8214* (2013.01); *H04W 4/24* (2013.01)

(58) Field of Classification Search
CPC ........ G06Q 30/04; G06Q 50/06; G06Q 40/12; G06F 40/18; H04W 4/26
USPC .............................................. 705/30, 34, 40
See application file for complete search history.

(56) References Cited

U.S. PATENT DOCUMENTS 8,359,389 B1   1/2013 Cohen et al.
9,710,859 B1 *  7/2017 Theimer ................ G06Q 40/10
(Continued)

FOREIGN PATENT DOCUMENTS

WO    WO-2009/016580 A2    2/2009
WO    WO-2009016580 A2 *   2/2009 ............. G06Q 50/06

OTHER PUBLICATIONS

European Search Report for Application No. 16201434.4 dated May 26, 2017.

*Primary Examiner* — George Chen
*Assistant Examiner* — Freda A Nelson
(74) *Attorney, Agent, or Firm* — Harness, Dickey & Pierce, P.L.C.

(57) ABSTRACT

A system, a computer-implemented method, and a computer readable medium having stored thereon a computer executable program code for processing data related to monitoring and controlling of a network providing resources to users is disclosed herein. The method includes: receiving a resource usage record (RUR) from the network component for a resource provided to a user, identifying a resource type of the resource by using a resource usage description comprised in the RUR, identifying a user type of the user by using an identification information comprised in the RUR, generating a record in the database, selecting records in the database, each complying with a selection criterion specifying that a record to be selected is associated with a resource type assigned to the selection criterion and a user type assigned to the selection criterion, and sending batch data to the rating system, the batch data comprising resource usage descriptions.

20 Claims, 4 Drawing Sheets

(51) Int. Cl.
*H04W 4/24* (2018.01)
*G06Q 30/04* (2012.01)
*G06Q 40/00* (2012.01)

(56) References Cited

U.S. PATENT DOCUMENTS

| | | | |
|---|---|---|---|
| 2002/0107754 A1* | 8/2002 | Stone | H04M 15/73 |
| | | | 705/34 |
| 2011/0173109 A1* | 7/2011 | Synesiou | G06Q 30/04 |
| | | | 705/34 |
| 2015/0308856 A1 | 10/2015 | Srinivasan et al. | |
| 2016/0044182 A1* | 2/2016 | Leemet | H04M 15/781 |
| | | | 455/406 |

* cited by examiner

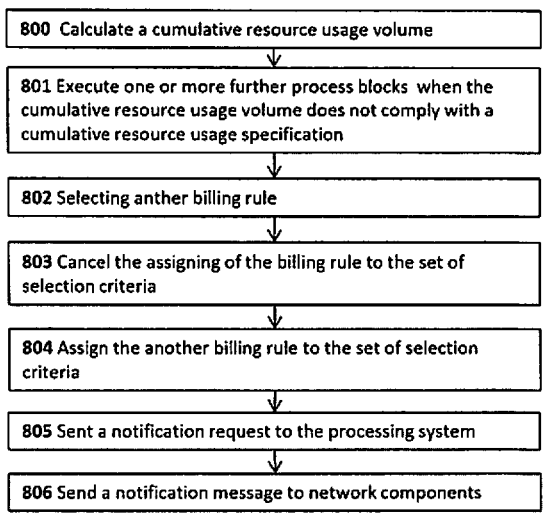
FIG. 8
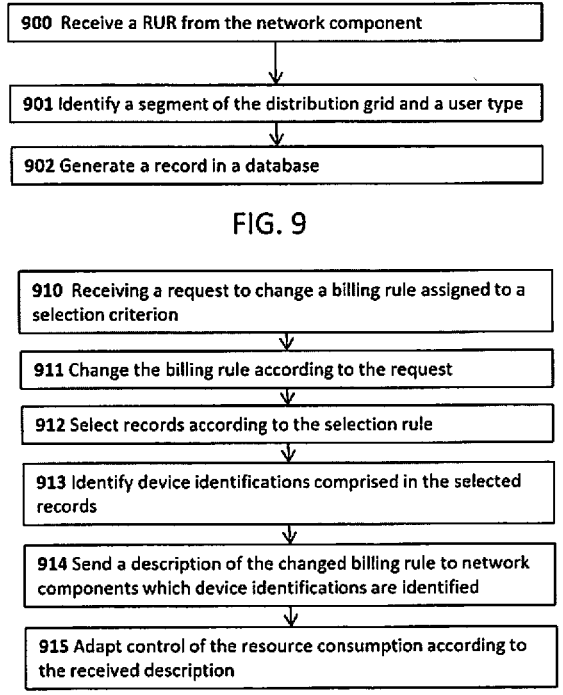
FIG. 9
FIG. 10

TELECOMMUNICATION SYSTEM FOR MONITORING AND CONTROLLING OF A NETWORK PROVIDING RESOURCE TO A USER

TECHNICAL FIELD

This invention relates to telecommunication processing systems. In particular, this invention relates to a flexible and efficient telecommunication system for monitoring and controlling a network providing resources to users.

BACKGROUND

In telecommunications, rating is an activity that determines the cost of chargeable events, such as a cost of service usage, a telephone call, a text message, a data download, a purchase, and the like. Rating may also be performed with regard to other services, such as radio-monitored toll ways, public transit, and the like. Telecommunication access points, turnstiles, and other access points for chargeable events typically generate usage data, in the form of various data items describing consumption/usage of various resources. Examples of such data items include Call Detail Records (CDR), Event Detail Records (EDR), Usage Detail Records (UDR), and Internet Protocol Detail Records (IPDR). These data items are sent to, or retrieved by, various processing systems. Afterwards, rating systems determine charge amounts for the received data items. The cost of the events is then provided to, or retrieved by, an invoicing process.

SUMMARY

Resource usage record (RUR) is, as understood here, is a data item comprising a specification of a resource used/consumed. It can further comprise at least one or the following, a quantity of the resource used/consumed, a specification of date and time when the usage/consumption of the resource took place, a specification of a time interval in which the usage/consumption took place, and an identification information. The identification information can comprise at least one of the following: a device identification of a device which has generated the RUR, device identifications of devices, if any, connected to or operated by the device which has generated the RUR.

The disclosure generally describes computer-implemented methods, computer-readable media, and telecommunication systems for processing of data representing events of resource consumptions, e.g. RURs, CDRs, IPDRs, EDRs etc. The processing of data is used for monitoring and controlling networks providing resources to users. The data to be processed can have different formats; in addition it can be related to consumption of different resources. As usual the processing of RURs and alike is related to contracts of users. A straightforward approach can be based on processing of each RUR. The rating of a single RUR on a basis of this approach requires identification of a user to whom the MIR is assigned, retrieving of a rule for processing of the RUR from a contract of the identified user, generating a charge amount for the RUR using the retrieved billing rule, sending signals/instructions to components generating RURs for monitoring and/or controlling of a consumption/usage of resources provided to users. This discrete processing of RURs can be inefficient, when compared with batch processing of RURs. Implementation of a batch processing on a basis of this approach can require aggregation of RURs assigned to a particular user and calculating charge amounts for the aggregated RURs using processing rules retrieved from a contract of said user. This way of batch processing has as a number of disadvantages as well. Aggregation of RURs assigned to a user requires processing of heterogeneous data, because the user can use different resources like electricity and video on demand, which can originate from different providers. As a result thereof batch processing of RURs can be compromised by the need to process heterogeneous data. Application of this approach is quite difficult when there is a need to take into account parameters related to cumulative consumption/usage of a resource by a plurality of users. This data can be very important for monitoring and managing of loading of various segments of an electricity distribution grid. Effective group management of electricity consumption of users connected to a particular segment of a grid can be very important for preventing overloading of the segment of the grid. Another disadvantage of the aforementioned approach is a problem of data protection. User data, such as user contracts, is addressed in each event of RUR rating. As a result the rating system has to comprise extra data protection means in order to avoid unauthorized disclosure of the user data, which can be caused by e.g. hacker attacks. Moreover, application of the correct billing rule for the rating of a particular MIR requires that this RUR comprises user identification data or data which can be used for user identification by a system configured to receive and process RURs. This causes another problem of user data protection, because users are concerned about details of their resource consumption disclosed to unauthorized parties. A straightforward solution of this problem can require utilization of additional hardware and/or software means for data protection in the system for receiving and processing of RURs and/or for secure data exchange between network components configured to generate RURs and the system for receiving and processing of RURs. The secure data exchange can be very difficult to implement when a network component is a simple device for registering water or electricity consumption, in particular when the network component is a legacy device supporting only internet protocols, which cannot provide the secure data exchange.

Processing of RURs according to present invention enables avoiding the aforementioned disadvantages. There is no need to generate RURs comprising user identification. RUR can comprise information which is sufficient for identification of at least one of the following: a user type (e.g. private, public, corporate, municipal, user having a postpaid billing schedule, user having a prepaid billing schedule, user located in a particular area, etc.), a type of resource (e.g. gas, electricity, water, internet, video on demand, telephone communication, etc.), and a network component, which has generated the RUR (e.g. device identification). Received RURs are translated into records in a database: The record in the database comprises a resource usage description and an identification information comprised in the original RUR, further it is associated in the database with the user type and the resource type both identified using the original RUR. The resource usage description can comprise a specification of a resource consumed/used and a quantity of the resource consumed/used. In addition the resource usage description can comprise a specification of date and/or time when the resource is consumed/used and/or specification of time interval in which the resource is consumed/used. The resource usage description can be for instance a number of kilowatt hours of electricity consumed by home appliances of a user in a specific interval of time, a bank transfer specifying an amount of money transferred and a day of transfer, a specification of a phone call made (e.g. CDR), a description of a rented car and a specification of a car rental period. This way of data processing does not enable authorized parties having access to the database and/or traffic of RURs to reconstruct a user profile comprising consumption/usage of various resources by a particular user.

The records are aggregated by user type and/or the resource type for rating thereby enabling generation of charge amounts using one billing rule. As a result thereof the rating system can process batch wise data of the same type. The generated charge amounts are appended to the same records, which were used for generation of charge amounts. This feature provides for consistency of data in an efficient way. The rating system can store only billing rules. The billing rules are assigned to specific resource types and/or user types. When an authorized party gets access to the rating process and/or components providing the billing process it is not possible to reconstruct the aforementioned user profile.

The contracts of users can be constructed out of the billing rules. They can be stored in an invoicing system being the only one component which stores user identification data assigned to billing information of users. As a result there is no need for advanced data protection for information exchange between various components. The invoicing system receives invoice data by communicating a list of device identifications of network components assigned to a particular user. The list as such does not contain any information related to the user identification data such as names, addresses, etc. in the other words the list is anonymous. The records are aggregated according to the list and billing relevant data comprised therein is transmitted to the invoicing system. This way of contract formulation provides for an effective implementation of changes in the contracts. Macro changes, i.e. changes affecting groups of users, can be implemented by changing billing rules. As usual such changes are initiated by resource providers. Changes related to a particular user can be implemented by changing an identification procedure for identifying user types and resource types using information comprised in RURs received from a particular network component. As a result next RUR received from the network component will result in the generation of a record associated with a different user type and/or a different resource. In addition, the telecommunication system comprises various functionalities related to interaction with users in cases when billing rules are changed and/or a user response related to changes in billing rules is required. As it will be shown further in description, users can select different billing rules offered by the telecommunication system or get notifications related to changes in billing rules without a risk of getting their confidential information disclosed to unauthorized parties. Yet another advantage of the claimed invention is a straightforward aggregation of billing data per user. This is of particular advantage for convergent billing. In any case, it is much more practical for almost any user to receive one bill for usage of different resources provided by different providers instead of receiving a separate bill from each provider. Another advantageous functionalities of the present invention like monitoring and managing of resource consumption/utilization, effective processing of down payments in combination with offset recurring charges in variable billing cycles are discussed further.

It is an objective of embodiments of the invention to provide for a telecommunication system configured to provide effective and secure processing of data related to resource usage, a computer-implemented method for performing same, and a computer readable medium having stored thereon a computer executable program code for executing the computer-implemented method.

According to one embodiment, the present invention relates to a computer-implemented method for processing of resource usage records, RURs, in a telecommunication system comprising a rating system, a database, a processing system, and a network component configured to generate the RURs, each of the RURs comprising a resource usage description of usage of one of resources and an identification information. The method comprises the following steps performed by the processing system: receiving a RUR from the network component for a resource provided to a user, identifying a resource type of the resource by using a resource usage description comprised in the received RUR, identifying a user type of the user by using an identification information comprised in the received RUR, generating a record in the database, the record comprising the resource usage description comprised in the received RUR, the identification information comprised in the received RUR, the record being associated with the identified resource type and the identified user type, selecting records in the database, each complying with a selection criterion specifying that a record to be selected is associated with a resource type assigned to the selection criterion and a user type assigned to the selection criterion, and sending batch data to the rating system, the batch data comprising resource usage descriptions, each comprised in the respective selected record, the method further comprises the following steps being performed by the rating system in response to receiving of the batch data from the processing system: generating a charge amount for each of the resource usage descriptions comprised in the batch data, and sending a billing data to the processing system, the billing data comprising the charge amounts.

According to another embodiment, the present invention relates to a computer-implemented method for controlling a distribution of a resource via a distribution grid consisting of segments. The method is enabled by a telecommunication system comprising a rating system, a processing system, a database, and network components configured to control consumption of the resource and to generate resource usage records, RURs. Each RUR comprises a resource consumption description of the resource delivered via the distribution grid an identification information comprising a device identification of a network component which has generated the each RUR. The method comprises the following steps executed by the processing system: receiving a RUR from one of the network components for the resource consumed by a user, identifying a segment of the distribution grid and a user type of the user by using an identification information comprised in the received RUR, generating a record in a database, the record comprising a resource consumption description comprised in the received RUR and the identification information comprised in the received RUR, the record being associated with the identified segment and the identified user type. The rating system is configured to generate charge amounts for resource usage consumption descriptions comprised in records complying with a selection criterion specifying that a record to be selected has the identified user type and the identified segment. The processing system is configured to perform the following steps of the method in response to receiving of a request to change the billing rule: changing the billing rule according to the request, selecting records according to the selection criterion, identifying device identifications comprised in the selected records, sending a description of the changed billing rule to network components which device identifications are identified. At least one of the network components is configured to perform the following step of the method in response to receiving of the description: adapting control of the resource consumption according to the received description.

According to another embodiment, the present invention relates to a computer readable medium having stored thereon a computer executable code for execution by a computer processor controlling a control system, wherein execution of the instructions of the executable code causes the computer processor to execute the computer-implemented method of any of the aforementioned embodiments.

According to another embodiment, the present invention relates to a telecommunication system comprising a rating system, a processing system, a database, and a network component configured to generate resource usage records, RURs, each comprising a resource usage description of usage of one of resources and an identification information, the database being configured to store records. The processing system is configured to perform the following steps: receiving a RUR from the network component for a resource provided to a user, identifying a resource type of the resource by using a resource usage description comprised in the received RUR, identifying a user type of the user by using an identification information comprised in the received RUR, generating a record in the database, the record comprising the resource usage description comprised in the received RUR, the identification information comprised in the received RUR, the record being associated with the identified resource type and the identified user type, selecting records in the database according to a selection criterion specifying that a record to be selected is associated with a resource type assigned to that selection criterion and a user type assigned to that selection criterion, and sending batch data to the rating system, the batch data comprising resource usage descriptions, each comprised in the respective selected record. The rating system is configured to perform the following steps in response to receiving of the batch data from the processing system: generating a charge amount for each of the resource usage descriptions comprised in the batch data, and sending a billing data to the processing system, the billing data comprising the charge amounts.

According to another embodiment, the present invention relates to a telecommunication system for controlling a distribution of a resource via a distribution grid consisting of segments, the telecommunication system comprising a rating system, a processing system, a database, and network components configured to control consumption of the resource and to generate resource usage records. RURs, wherein each RUR comprises a resource consumption description of the resource delivered via the distribution grid an identification information comprising a device identification of a network component which has generated the each RUR. The processing system is configured to perform the following steps: receiving a RUR from one of the network components for the resource consumed by a user, identifying a segment of the distribution grid and a user type of the user by using an identification information comprised in the received RUR, generating a record in a database, the record comprising a resource consumption description comprised in the received RUR and the identification information comprised in the received RUR, the record being associated with the identified resource type and the identified user type. The rating system is configured to generate charge amounts for resource usage consumption descriptions comprised in records complying with a selection criterion specifying that a record to be selected has the identified user type and the identified segment. The processing system is configured to perform the following steps in response to receiving of a request to change the billing rule: changing the billing rule according to the request, selecting records according to the selection criterion, identifying device identifications comprised in the selected records, sending a description of the changed billing rule to network components which device identifications are identified. At least one of the network components is configured to perform the following in response to receiving of the description: adapting control of the resource consumption according to the received description.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 shows a flowchart of an example method.
FIG. 9 shows a flowchart of an example method.
FIG. 10 shows a flowchart of an example method.

DETAILED DESCRIPTION

Figure 1:
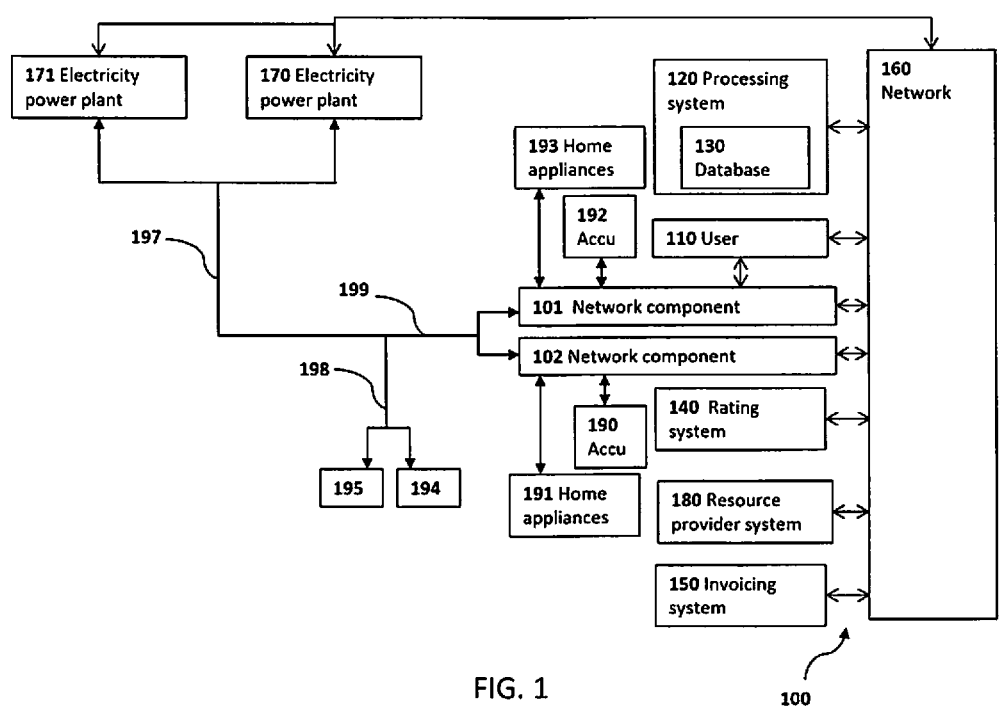
FIG. 1 is a block diagram illustrating an example environment for processing of data related to resource usage.

This disclosure generally describes computer-implemented methods, computer-readable media, and telecommunication systems for processing of data related to resource usage. A resource usage event can be specified as a RUR comprising at least one of the following a resource usage description and an identification information. Various components of the telecommunication systems are configured to perform specific steps of the computer-implemented methods. As it will be clearly seen from the following description, the distribution of the workload of processing of the resource usage events provides for an improvement of productivity and an advanced data protection.

The following description is presented to enable any person skilled in the art to practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

According to another embodiment, the rating system is configured to generate charge amounts for resource usage description comprised in batch data according to billing rules, wherein each of the billing rules is assigned to a respective selection criterion of a set of selection criteria comprising the selection criterion, wherein the rating system is configured to perform the following step in response to receiving of the batch data from the processing system: identifying a billing rule assigned to the selection criterion, wherein the generating of the charge amount for each of the resource usage descriptions comprised in the batch data is executed according to the identified billing rule.

According to another embodiment, the rating system is configured to generate charge amounts for resource usage descriptions comprised in batch data according to billing rules each having a resource usage specification, wherein each of the billing rules is assigned to a respective selection criterion of a set of selection criteria comprising the selection criterion, wherein the resource type assigned to the selection criterion is the identified resource type and the user type assigned to the selection criterion is the identified user type, wherein the rating system is configured to perform the following in response to receiving the of batch data from the processing system: identifying a billing rule assigned to said selection criterion, wherein the generating of the charge amount for each of the resource usage descriptions comprised in the batch data is executed according to the identified billing rule, wherein the rating system is configured to perform the following steps in response to receiving the batch data from the processing system: selecting another billing rule when the resource usage description comprised in the received UA does not comply with a resource usage specification of the identified billing rule and complies with a resource usage specification of the another billing rules, wherein the another billing rule is assigned to another selection criterion, wherein another user type and the identified resource type are assigned to the another selection criterion, sending to the processing system a notification request comprising a description of the another billing rule, wherein the processing system is configured to perform the following in response to receiving the notification request: sending to the network component a notification message comprising the description of the another billing rule, the network component is configured to perform the following steps in response to receiving of the notification message: prompting the user as to whether the user wishes to approve the another billing rule, sending to the processing system a response message indicating that the user has approved the another billing rule, when the user has approved the another billing rule, wherein the processing component is configured to perform the following in response to receiving of the response message: executing a reconfiguration procedure causing the processing system to identify the another user type in further execution of the identifying of a user type of a user by using an identification information comprised in another received RUR, when the another received RUR is received from the network component for the resource provided to the user.

According to another embodiment, the selecting of the records in the database and the sending of the batch data to the rating system is executed according to a schedule and/or when an overall number of records in the database complying with the selection criterion is bigger than a predefined value.

According to another embodiment, the selection criterion specifies a predefined time interval in which a resource specified in a resource usage description comprised in a record to be selected is used.

According to another embodiment, the selection criterion specifies that a record to be selected comprises a resource usage description for which the charge amount is not yet generated.

According to another embodiment, the processing system is configured to perform the following step in response to receiving of the billing data from the rating system: appending each of the charge amounts to the respective record comprising the resource usage description for which the each of the charge amounts is generated, wherein the telecommunication system further comprises an invoicing system being configured to perform the following at an end of a billing cycle assigned to the user: sending to the processing system an invoice data request comprising a record selection criterion assigned to the user and the billing cycle, the processing system being configured to perform the following steps in response to receiving of the invoice data request: selecting other records in the database each comprising an identification information complying with the record selection criterion, a charge amount, and a resource usage description indicating that a resource used according to that resource usage description is used during the billing cycle, sending invoice data to the invoicing system, the invoice data comprising charge amounts, each comprised in the respective another record, the invoicing system being configured to perform the following step in response to receiving of the invoice data: generating an invoice using the invoice data.

According to another embodiment, the generating of the charge amount for each of the resource usage descriptions comprised in the batch data is executed according to a billing rule assigned to the selection criterion. The processing system being configured to perform the following step in response to receiving the invoice data request: associating each of the other records with a data marker indicating that the charge amount comprised in the each of the other records is used for invoicing. The wherein the processing system is configured to perform the following steps in response to receiving of a request to assign another billing rule to the selection criterion: cancelling the assigning of the billing rule to the selection criterion, assigning the another billing rule to the selection criterion, repeating the selecting of records in the database according to the selection criterion, and sending another batch data to the rating system, wherein the another batch data comprises resource usage descriptions, each comprised in the record selected in the repeating of the selecting of the records in the database according to the selection criterion. The rating system is configured to perform the following steps in response to receiving of the another batch data from the processing system: generating a charge amount for each of the resource usage descriptions comprised in the another batch data using the another billing rule, and sending another billing data to the processing system, the billing data comprising the charge amounts generated in the generating of the charge amount for each of the resource usage descriptions comprised in the another batch data. The processing system is configured to perform the following step in response to receiving of the another billing data from the rating system: appending each of the charge amounts comprised in the another billing data to the respective record comprising the resource usage description for which the each of the charge amounts comprised in the another billing data is generated when the respective record comprising the resource usage description for which the each of the charge amounts comprised in the another billing data is generated does not comprise the charge amount or the respective record comprising the resource usage description for which the each of the charge amounts comprised in the another billing data is generated is associated with the data marker, otherwise substituting a charge amount comprised in the respective record comprising the resource usage description for which the each of the charge amounts comprised in the another billing data is generated by the each of the charge amounts comprised in the another billing data.

According to another embodiment, the invoicing system being configured to perform the following step at an end of another billing cycle assigned to the user: sending to the processing system another invoice data request comprising the record selection criterion and the another billing cycle. The processing system being configured to perform the following steps in response to receiving of the invoice data request: selecting other records in the database each comprising either an identification information complying with the record selection criterion, only one charge amount, and a resource usage description indicating that a resource used according to that resource usage description is used during the another billing cycle or an identification information complying with the record selection criterion and charge amounts, and sending another invoice data to the invoicing system, the invoice data comprising charge amounts each comprised in the respective another record selected in the selecting of the other records in the database each comprising either an identification information complying with the record selection criterion, only one charge amount, and the resource usage description indicating that the resource used according to that resource usage description is used during the another billing cycle or the identification information complying with the record selection criterion and the charge amounts, wherein the charge amounts comprised in the same record are associated with each other in the another invoice data. The invoicing system being configured to perform the following step in response to receiving of the another invoice data: generating another invoice using the another invoice data. The generating of the another invoice using the another invoice data comprises: specifying a charge amount in the another invoice when that charge amount does not have an associated charge amount in the another invoice data, and specifying a differential charge amount in the another invoice for the associated charge amounts, wherein the differential charge amount is equal to one of the associated charge amounts minus another one of the associated charge amounts, wherein the one of the associated charge amounts is generated after the another one of the associated charge amounts.

According to another embodiment, the identification information of the received RUR comprises a device identification of the network component. The telecommunication system comprises a resource provider system configured to generate RURs related to basic fees for providing access to the resource for the user. The resource provider system is configured to perform the following step: sending another RUR to the processing system, the another RUR comprising an identification information and a resource usage description. The identification information comprised in the another RUR comprises the device identification of the network component. The resource usage description comprised in the another RUR comprises a basic fee for providing access to the resource and a description of the resource. The processing system is configured to perform the following steps: receiving the another RUR from the resource provider system, identifying a resource type of the resource by using the resource usage description comprised in the another RUR, identifying a user type of the user by using the identification information comprised in the another RUR, generating another record in the database. The another generated record comprises the resource usage description comprised in the another RUR, the identification information comprised in the another RUR, a charge amount being equal to the basic fee comprised in the resource usage description comprised in the another RUR. The another record is associated with the resource type identified in the identifying of resource type of the resource by using the resource usage description comprised in the another RUR and the user type identified in the identifying of the user type of the user by using the identification information comprised in the another RUR.

According to another embodiment, the identification information of the received RUR comprises a device identification of the network component, wherein the record generated in the step of the generating of the record in the database is assigned to the device identification, wherein the record selection criterion comprises a list of device identifications, wherein the record selection criterion specifies that an identification information of a record to be selected comprises any one of the device identifications of the list.

According to another embodiment, the rating system is configured to generate charge amounts for resource usage descriptions comprised in batch data according to billing rules each having a cumulative resource usage specification, wherein each of the billing rules is assigned to a respective selection criterion of a set of selection criteria comprising the selection criterion, wherein the rating system is configured to perform identifying a billing rule assigned to said selection criterion in response to receiving of the batch data from the processing system, wherein the generating of the charge amount for each of the resource usage descriptions comprised in the batch data is executed according to the identified billing rule, wherein the invoice data comprises resource usage descriptions, each comprised in the respective another record, wherein the invoicing system is configured to perform the following steps: calculating a cumulative resource usage volume using the resource usage descriptions in the invoice data each having the respective charge amount generated using the identified billing rule, selecting another billing rule when the cumulative resource usage volume complies with a cumulative resource usage specification of the another rule, wherein the another billing rule is assigned to another selection criterion, wherein another user type and the identified resource type are assigned to the another selection criterion, prompting the user as to whether the user wishes to approve the another bulling rile, sending to the processing system a request to use the another billing rule for the user when the user has approved the another billing rule, wherein the processing system is configured to perform the following steps in response to receiving of the request to use the another billing rule for the user: executing a reconfiguration procedure causing the processing system to identify the another user type in further execution of the identifying of a user type of a user by using an identification information comprised in another received RUR, when the another received RUR is received for the resource provided to the user from any of the network components having a device identification comprised in the list of device identifications.

According to another embodiment, the identification information of the received RUR comprises a device identification of the network component, wherein the record generated in the step of the generating of the record in the database is associated with the device identification, wherein the generating of the charge amount for each of the resource usage descriptions comprised in the batch data is executed according to a billing rule assigned to the selection criterion, wherein the processing system is configured to perform the following in response to receiving of a request to assign another billing rule to the selection criterion: cancelling the assigning of the billing rule to the selection criterion, assigning the another billing rule to the selection criterion, sending a notification message to network components of the telecommunication system, each having device identification assigned to the respective selected record, the notification message comprises a description of the another billing rule.

According to another embodiment, the request to assign the another billing rule to said selection criterion is received from a resource provider.

According to another embodiment, a network component of the telecommunication system is configured to perform the following step in response to receiving of the notification message: sending a communication signal to a user, the communication signal comprises the description of the another billing rule.

According to another embodiment, the processing system is configured to perform the following in response to receiving of the request to assign the another billing rule to said selection criterion: sending a configuration instruction to the rating system to use the another billing rule for generation of charge amounts comprised in batch data comprising resource usage descriptions comprised in records selected according to the selection criterion. The rating system is configured to perform the following in response to receiving of the configuration instruction: executing a reconfiguration procedure causing the rating system to generate charge amounts using the another billing rule in further execution of the generating of a charge amount for each of resource usage descriptions comprised in another received batch data when the another received data comprises resource usage descriptions comprised in records selected according to the selection criterion.

According to another embodiment, the rating system is configured to generate charge amounts for resource usage descriptions comprised in batch data according to billing rules each having a cumulative resource usage specification, wherein each of the billing rules is assigned to a respective selection criterion of a set of selection criteria comprising the selection criterion, wherein the rating system is configured to perform the following steps in response to receiving of the batch data from the processing system: calculating a cumulative resource usage volume using the batch data, preforming the following when the cumulative resource usage volume does not comply with a cumulative resource usage specification of a billing rule assigned to the selection criterion: selecting anther billing rule, wherein the cumulative resource usage volume complies with a cumulative resource usage specification of the another billing rule, cancelling the assigning of the billing rule to the selection criterion, assigning the another billing rule to the selection criterion, wherein the charge amounts in the generating of the charge amount for the each of the resource usage descriptions comprised in the batch data are generated using the another billing rule when the cumulative resource usage volume complies with the cumulative resource usage specification of the another billing rule, wherein the charge amounts in the generating of the charge amount for the each of the resource usage descriptions comprised in the batch data are generated using the billing rule when the cumulative resource usage volume complies with the cumulative resource usage specification of the billing rule.

According to another embodiment, the identification information of the received RUR comprises a device identification of the network component, wherein the record generated in the step of the generating of the record in the database is associated with the device identification, wherein the rating system is configured to perform the following steps in response to receiving of the batch data from the processing system: sending to the processing system a notification request comprising a description of the another billing rule when the cumulative resource usage volume does not comply with the cumulative resource usage specification of the billing rule assigned to the selection criterion. The processing system is configured to perform the following in response to receiving of the notification request: sending a notification message to network components of the telecommunication system, each having device identification assigned to the respective selected record, the notification message comprising the description of the another billing rule.

According to another embodiment, the request is received from a resource provider of the resource, wherein the request is generated by the resource provider on a basis of monitoring availability of the resource by resource sources connected to the grid.

According to another embodiment, the at least one of the network component is configured to manage consumption of the resource by causing a resource accumulation device being connected to the same node of the distribution grid as the at least one of the network components when a price of the resource according to the billing rule is below a predefined price and by causing the resource accumulation device to provide the resource as alternative to the resource provided via the gird when the price of the resource according to the billing rule is higher than another predefined price.

According to another embodiment, the resource is electricity.

According to another embodiment, the at least one of the network components is a smart home appliance.

FIG. 1 illustrates an example environment 100 for processing of data related to consumption/usage of resources. The example environment comprises a one or more network components 101, 102, a processing system 120, a database 130 which can be comprised in a processing system 120, a rating system 140, an invoicing system 150, a resource provider system 180, and one or more computer networks 160. The computer networks can comprise one or more wireless networks and/or one or more wired networks. The wireless network can be a WiFi or a digital cellular telecommunication network. Utilization of the latter for providing communication between network components and the processing system can provides for an effective operation of a plurality of network components. The network components can register and/or control consumption/usage of various resources. They can be installed in various (remote) locations. In this case wireless communication eliminates the need to provide a wired connection to each of the network components. The one or more networks 160 provide communication between the network components and the processing system, between the processing and the database when the latter is implemented a remote device, between the processing system and the rating system, between the processing system and the invoicing system, between the resource provider system and various components of the example environment such as the rating system, the invoicing system, the processing system, one or more resource generating facilities 170, 171, and one or more network components, and if necessary between the rating system and the invoicing system. The resource providing facilities can be for instance electricity power plants as depicted on FIG. 1. Alternatively the resource providing facilities can be base stations of a digital cellular telecommunication network. The resource provider system can distribute to new billing rules via one or more computer networks 160 to various components of the example environment such as the network components 101, 102, the rating system 140, the processing system 120. Alternatively or in addition, the resource provider system can modify a billing rule used by any of the aforementioned components. The distribution of the new billing rules or modification of the currently used billing rules can be executed by the resource provider system on a basis of information received from the resource generation facilities 171, 170. The received information can indicate availability of resources at the resource generation facilities. In one example the availability of resources can be determined by a supply-demand situation on a market of the resources, wherein high demand of a resource drives its price high and low demand of the resources drives its price low.

The one or more networks 160 can further provide for a communication between the user 100 and an invoicing system 150. One or more networks components can comprise means for communication with the user 110. This can be implemented by hardware user interfaces comprised in some of the network components and/or by communicating with devices operated by the user, e.g. a smartphone. The communication between the device operated by the user and the network component can be implemented via the one or more computer networks 160. The network components are configured to generate RURs being descriptive of events of usage/consumption of resources by users. Each RUR comprises a resource usage description and an identification information. The resource usage description specifies a resource used/consumed by a user and/or quantity of a resource used/consumed by the user. The identification information can comprise a device identification of a network component which has generated a RUR. The network components can be installed at different nodes of various distribution networks and/or grids 197 providing to users resources like water, electricity, and gas. In this case the identification information comprised in a RUR generated by such a network component can comprise information enabling determination a node and/or segment 199, 198 of the network to which the network component is connected. FIG. 1 depicts network components 101 and 102 connected to a segment 199 of the grid 197. The grid comprises another segment 198. Other users 195, 194 are connected to a segment 198 of the grid.

The network component can be for instance a handheld mobile device configured to generate RURs related to internet traffic provided to the handheld mobile device or a telephone call made using the handheld mobile device. Another network component can be an electricity or water usage meter. Some of the network components can be configured to manage/control consumption of a resource like electricity. Such a network component can be a smart home appliance causing an electrical accumulator to provide electricity stored in an accumulator for usage by other home appliances when a price of electricity is higher than a threshold price and causing the electrical accumulator to charge from a grid when the price of electricity is lower than another threshold price. The network component 101 (102) can be such a smart home appliance electricity meter. The network component is configured to generate RURs related to electricity consumed by home appliances 193 (191) and for charging the electrical accumulator 192 (190). The network component is connected to the segment 199 of the electricity distribution grid 197. The network component is configured to receive billing rules from the resource provider system 180 via a computer network 160. The billing rule can specify a current price of electricity and/or pricing of electricity versus time for an interval of time in the future. For instance the billing rule can comprise a day electricity tariff and a night electricity tariff for tomorrow, for coming week, or for coming month. Depending on the current price and/or future pricing the network component can manage the following options for electricity consumption: in a first case when the current price of electricity of below a first price the network component can cause charging of the electrical accumulator, in a second case when the current price of electricity is higher than a second price the network component can provide electricity stored in the electrical accumulator for consumption by home appliances 193 as alternative to electricity delivered via the segment 199 of the electrical grid 197 thereby reducing or preventing consumption of the electricity delivered to the home appliances 193 via the segment 199, wherein the second price is higher than the first price.

The processing system is configured to receive RURs and generate records in database using information comprised in the received RURs. It is further configured to select the records according to selection criteria and send information in the selected records to the rating system or to the invoicing system. The rating system is configured to generate charge amounts using information received from the processing system and to send the generated charge amounts to the processing system. The processing system is configured to receive the charge amounts from the rating system and to append them to the records. The invoicing system is configured to generate invoices using data received from the processing system. The resource provider system is configured to monitor a consumption/usage of a resource by receiving information related to the consumption/usage of the resource from the processing system, monitor availability of the resource by communicating with the resource generation facilities, to generate new billing rules (and/or to change currently used billing rules) on a basis of the availability of the resource and an overall consumption of the resource calculated using the information received from the processing system, and to distribute the new billing rules (and/or changes in the currently used billing rules) to components of the example environment 100, such as the network components, 101, 102, the invoicing system 150, the rating system 140, and the processing system 120.

Usage/consumption of resource can be related to fixed (periodic) costs (e.g. incidental costs, basic fees) which are not related to an actual usage/consumption of the resource. An example of such a cost can be a payment for connection of a user device to a resource distribution network. For instance, a telecom provider can request a fixed amount to be payed when a user purchases a new SIM card for his mobile phone. The provider can further request another fixed amount to be paid on a periodic basis with independent of duration of telephone calls, if any, made using the purchased SIM card. Users having prepaid accounts by telecom providers can pay fixed amounts per month even if they do not use services of the telecom providers at all. In order to address this demand, the resource provider system and/or the invoicing system can be configured to generate RURs and send them to the processing system, In its own turn the processing system can be configured to receive the RURs from the resource provider system and process them in the same way as the RURs received from the network components.

The invoicing system can be configured to generate RURs in other cases as well. These RURs can be sent by the invoicing system to the processing system which can be configured to process them in the same way as the RURs received from the network components. The RURs generated by the invoicing system can be generated by the invoicing system on a basis of analysis of data received from the processing system. The data received from the invoicing system can comprise resource usage descriptions of a particular resource. The invoicing system can generate a RUR when a cumulative resource usage volume of the resource calculated using the resource usage descriptions is higher than a threshold value or lower than another threshold value. This can be the case when a user does not use the resource as specified in his contract. The generated RUR, when processed by the rating system and the invoicing system, results in an (penalty) charge amount in the invoice generated by the invoicing system for the user or in a reduction of an overall charge amount specified in the invoice.

The network components, the processing system, the database, the rating system, and the invoicing system, each can comprise a computer processor and a memory storing computer executable code which when executed by the processor causes it to execute steps of computer-implemented methods described herein.

Figure 2:
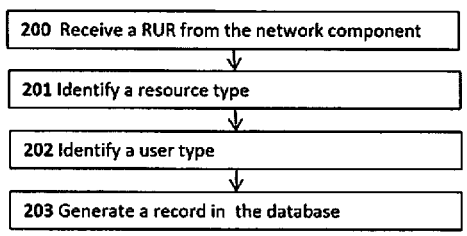
FIG. 2 shows a flowchart of an example method.

FIG. 2 illustrates a computer-implemented method for initial processing of the RURs received from network components and generation of records in the database in response to the receiving of the RURs. The method begins with a process block 200. In process block 200 processing system receives a RUR is received the from a network component. The received RUR is generated for a resource provided to a user. Process block 201 is executed after process block 200. In process block 201 the processing system identifies a resource type of the resource by using a resource usage description comprised in the received RUR. The resource type can be for instance water, gas, electricity, telephone call, internet connection, a bank transaction, etc. Process block 202 is executed after process block 201. In process block 202. the processing system identifies a user type of the user by using an identification information comprised in the received RUR. The user type can be for instance a user of a particular group of users, a private user, a corporate user, a user having a prepaid contract, a user having a postpaid contract, a user authorized to user a particular group of resources, etc. The user type can be a combination of these user types as well. The identification of the user type can be implemented by assigning of a device identifications comprised in identification information of RURs to user types. For instance when the processing system identifies a particular device identification comprised in identification information comprised in a received RUR, then it identifies a corresponding particular user type assigned to said particular device identification. In general, the processing system can store lists of device identifications each being assigned to a respective user type. Process block 203 is executed after process block 202. In process block 203 the processing system generates a record in the database. The record comprising the resource usage description comprised in the received RUR and as option the identification information comprised in the received RUR. The record is associated with the identified resource type and the identified user type. The record can be further associated with the device identification of the network component from which the RUR is received. Process blocks 200-203 can be repeated for each RUR received from the same or other network components.

Figure 3:
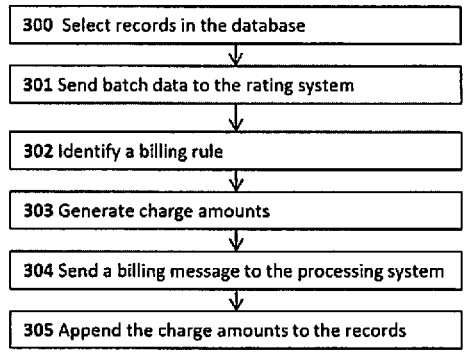
FIG. 3 shows a flowchart of an example method.

FIG. 3 illustrates a computer-implemented method for rating of the resource usage descriptions comprised in the records stored in the database. The method begins with process block 300. In process block 300 the processing system selects records in the database according to a selection criterion. The selection criterion specifies that that a record to be selected is associated with a resource type assigned to that selection criterion and a user type assigned to that selection criterion. The selection criterion can further specify a predefined time interval in which a resource specified in a resource usage description comprised in a record to be selected is used. The selection criterion can further specify that a record to be selected comprises a resource usage description for which the charge amount is not yet generated. Execution of process block 300 can be triggered according to a schedule, specifying time events when records have to be selected according to the selection criterion. Alternatively or in addition execution of process block 300 can be triggered when a number of records complying with the selection criterion are bigger than a predefined number. The selection criterion can be one of selection criteria of a set of selection criteria. For each of at least some of them a respective schedule and/or a respective predefined number triggering execution of process block 300 can be specified. Each of the selection criteria can have a respective billing rule assigned to it. The billing rule can specify charge amount versus a cumulative volume of a consumed resource and as option different pricing of the resource depending on time interval in which the resource is consumed. For instance it can specify a price of electricity in a time interval 20:00-6:00 and a price of electricity in a time interval 6:00-22:00.

Process block 301 is executed after process block 300. In process block 301 the processing system sends batch data to the rating system. The batch data comprises resource usage descriptions, each comprised in the respective record selected in process block 300. Process block 302 is executed after process block 301. In process block 302 the rating system identifies a billing rule assigned to the selection criterion used in process block 300. This can be done in various ways. Data determining the assignment of the selection criteria to the respective selection criteria can be stored either in the rating system or in the processing system. When the data is stored in the processing system then the batch data specifies the billing rifle to be used by the rating system. When the data is stored in the rating system than the batch data specifies the selection criterion which is used in process block 300. The latter option can provide better data protection because the rating system does not communicate with network components. As a result thereof its data exchange can be localized/limited only to communication with the processing system. Process block 303 is executed after process block 302. In process block 303 the rating system generates a charge amount for each of the resource usage descriptions comprised in the batch data using the billing rule identified in process block 302. Process block 304 is executed after process block 303. In process block 304 the rating system sends a billing data to the processing system. The billing data comprises the charge amounts generated in process block 303. Process block 305 is executed after process block 304. In process block 305 the processing system receives the billing data. Afterwards it appends each of the charge amounts comprised in the billing data to the respective record comprising the resource usage description for which the each of the charge amounts is generated in process block 303.

Although generation of charge amounts for various resource usage descriptions originating from different network components of different users are generated in one process block 303 using one billing rule it is possible to implement individual rating for each user. In this case not only resource usage descriptions have to be comprised in the batch data, but device identifications as well. Each resource usage description has to be associated with the device identification of the network component which has generated a RUR comprising the each resource usage description. In its own turn the billing rule can be formulated such that not only resource usage description is used for generation of a charge amount but a device identification as well. This approach can be illustrated on a basis of simple example. A billing rule can have two specifications for generation of charge amounts. One specification can be used for generating charge amounts using resource usage descriptions originating from one network component having a device identification. Another specification can be used for generating charge amounts using resource usage descriptions originating from another network component having another device identification.

As it is mentioned above, other components of the example environment 100 can generate RURs as well. The resource provider system can be configured to generate RURs related to basic fees for providing access to resources for users. In particular, the resource provider system is configured to perform the following step: sending a RUR to the processing system, wherein the RUR comprising an identification information and a resource usage description. This RUR can have the same data structure as the RUR received from the network component 200. The identification information of the RUR received from the resource provider system comprises the device identification of one of the network components. The resource usage description comprised in the another RUR comprises a basic fee for providing access to a resource and a description of the resource. The device identification comprised in the RUR generated by the resource provider system can enable processing the RUR using the same selection criteria as for Milts received from the network components. For instance, when the basic fee is for providing access to the same resource to the same user as in process block 200, then the device identification of the network component which has generated the RUR received in process block 200 is comprised in the identification information comprised in the RUR generated by the resource provider system.

The processing system is configured to perform the following steps in response to receiving the RUR from the resource provider system: identifying a resource type of the resource by using the resource usage description comprised in the received RUR (e.g. in the same way as in process block 201), identifying a user type of the user by using the identification information comprised in the received RUR (e.g. in the same way as in process block 202), and generating a record in the database. The generated record comprises the resource usage description comprised in the received RUR, the identification information comprised in the received RUR, and a charge amount being equal to the basic fee comprised in the resource usage description comprised in the received RUR. The generated record is associated in the database with the identified resource type and the identified user type. The process of the record generation is similar to the process of record generation in process block 203, however the generated record in this case comprises already the charge amount. In the other words it is the record which has the same data structure as records generated in process block 305.

Figure 4:
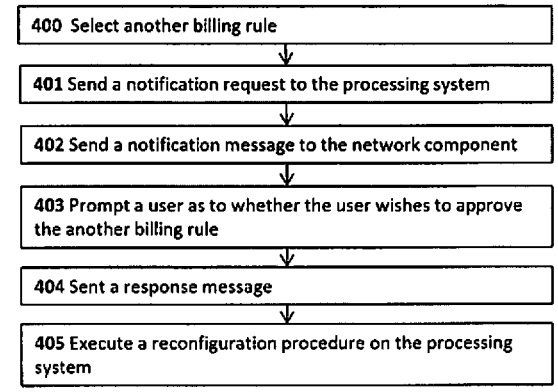
FIG. 4 shows a flowchart of an example method.

FIG. 4 illustrates a computer-implemented method for changing a billing rule for a particular user. At least some of each of the billing rules can have a respective resource usage specification. The telecommunication system can be configured to prompt a user to approve an alternative billing rule when a resource usage description does not comply with a resource usage specification of a billing rule used for calculation of a charge amount for the resource usage specification. The purpose of this procedure can be illustrated on the following example illustrating usage of three billing rules. A resource usage specification of a first billing rule specifies a user internet traffic having download volume of less than 1 Gb per month. A resource usage specification of a second billing rule specifies a user internet traffic having download volume less than 5 Gb per month. A resource usage specification of a third billing rule specifies a user internet traffic having download volume less than 10 Gb per month. Any of these billing rules is applicable for generation of charges for any data volume downloaded by a user. However, they can be formulated such that they provide the best cost benefit when the actual download volume complies with the resource usage specification. For instance, the first billing rule can specify a fixed charge amount of 1 Euro when a volume of downloaded. data is less than 1 Gb and 1 Eurocent for each extra 10 Mb of downloaded data. The second billing rule can specify a fixed charge amount of 3 Euro when a volume of downloaded data is less than 5 Gb and 1 Eurocent for each extra 10 Mb of downloaded data. The third billing rule can specify a fixed charge amount of 5 Euro when a volume of downloaded data is less than 10 Gb and 1 Eurocent for each extra 10 Mb of downloaded data.

The method begins with process block 400. In process block 400 the rating system selects another billing rule when a resource usage description comprised in the batch data sent in process block 301 does not comply with a resource usage specification of the billing rule identified in process block 302 and complies with a resource usage specification of the another billing rule. These two billing rules are assigned to different selection criteria, wherein the same resource type is assigned to both of the selection criteria and different user types are assigned to both of the selection criteria. Turning back to the aforementioned example, the resource usage description can specify a volume of downloaded data being equal to 4 Gb. The first billing rule is the billing rule identified in process block 302. The charge amount in this case is 4 Euro, i.e. 1 Euro for the first Gb and another 3 Euro for extra 3 Gb. The charge amount would be only 3 Euro when the second billing nine is applied. In this case, the rating system selects the second billing rule in process block 400.

Process block 401 is executed after process block 402. In process block 401 the rating system sends a notification request to the processing system. The notification request comprises a description of the another billing rule. The notification request can further comprise the resource usage description for which the another billing rule is selected in process block 401.

Process block 402 is executed after process block 401. In process block 402 the processing system receives the notification request. Afterwards it identifies a record comprising the resource usage description for which the another billing rule is selected. This can be done using the resource usage description comprised in the notification request. The processing system identifies a device identification associated with the identified record. The processing system sends to a network component having the identified device identification a notification message comprising the description of the another billing rule.

Process block 403 is executed after process block 402. In process block 403 the network component receives the notification message. Afterwards it prompts a user as to whether the user wishes to approve the another billing rule. This can be implemented by displaying a description of the another billing rule on a display of a user interface of the network component and receiving an input of the user via the user interface indicating either approval of the another billing rule or rejection of the another billing rule. The network component sends a response message to the processing system in process block 404 executed after process block 403, when the user has approved the another billing rule. The response message indicates that the user has approved the another billing rule.

The network component can be configured such that in case when in response to the displaying of the description no user input is received from the user within a predefined interval of time elapsed after starting of the displaying of the description the network component is sends the response message by default.

When the network component is not equipped with the user interface operable for displaying a description or as additional option the network component can be configured to communicate via a computer network with a user device equipped with a user interface being operable for displaying the description and receiving an input from the user. The user device can be for instance a smartphone or a tablet. In this case the network component forwards the description to the user device. In its own turn the user device forwards to the network component an input of the user, if any, indicating either approval or the another billing rule or rejection of the another billing rule.

Process block 405 is executed after process block 404 in case when the response message is sent. In process block 405 the processing system receives the response message. Afterwards it executes a reconfiguration procedure. The reconfiguration procedure causes the processing system to identify another user type in process block 202 in response to receiving in process block 200 of a RUR from the network component having the device identification identified in process block 402, when a resource type identified in process block 201 using a resource usage description comprised in the received RUR is the resource type assigned to the selection criterion assigned to the another billing rule selected in process block 400, wherein the another user type is assigned to the selection criterion assigned to the another billing rule selected in process block 400. The reconfiguration procedure can be implemented by cancelling assignment of a user type assigned to the device identification identified in process block 402 and assigning the another user type assigned to the selection criterion assigned to the another billing rule selected in process block 400 to the device identification identified in process block 402.

Figure 5:
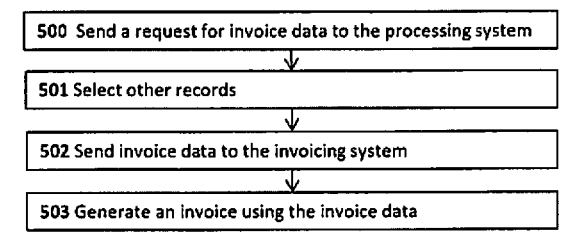
FIG. 5 shows a flowchart of an example method.

FIG. 5 illustrates a computer-implemented method for generating invoices. The method begins with process block 500. The invoicing system sends a request for invoice data request to the processing system. The billing request comprises a record selection criterion assigned to a user. The billing request can be send at an end of a billing cycle assigned to the user. Process block 501 is executed after process block 500. In process block 501 the processing system receives the request. Afterwards it selects in the database records complying with the record selection criterion specified in the request. The selected records comprise charge amounts. The selection of records can be restricted to the billing cycle, i.e. only records comprising resource usage descriptions indicating that resources used according to that resource usage descriptions are used during the billing cycle. The record selection criterion can comprise a list of device identification. The record selection criterion can specify that an identification information of a record to be selected comprises any one of the device identifications of the list. The list can be comprised in the request. Process block 502 is executed after process block 50. In process block 502 the processing system sends invoice data comprising charge amounts comprised in the records selected in process block 501. The invoice data can further comprise resource usage descriptions comprised in the records selected in process block 501. Process block 503 is executed after process block 502. In process block 503 the invoicing system receives the invoice data and generates an invoice using the received invoice data. Afterwards, the invoicing system can send it to the user. The list of the device identifications used in process blocks 500 and 501 can be assigned in the invoicing system to the user to whom the invoice is sent.

Figure 6:
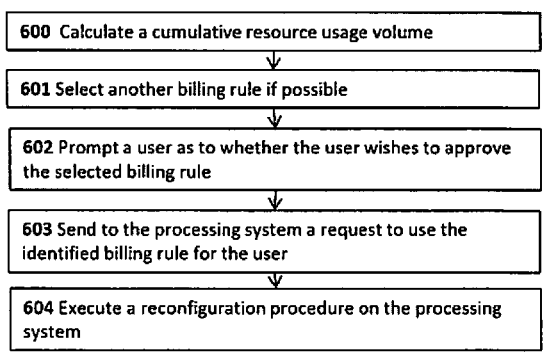
FIG. 6 shows a flowchart of an example method.

FIG. 6 illustrates a computer-implemented method for changing a billing rule for a user initiated by the invoicing system. At least some of each of the billing rules can have a respective assigned cumulative resource usage specification. The telecommunication system can be configured to prompt a user to select an alternative billing rule when a cumulative resource usage volume calculated using resource usage descriptions comprised in invoice data does not comply with a cumulative resource usage specification, wherein the cumulative resource usage specification is assigned to a billing rule used for calculating charge amounts using the same resource usage descriptions. The cumulative resource usage volume can be a sum of resource usage quantities specified in the resource usage descriptions. Alternatively, the user can trigger execution of this method after a receipt of the invoice generated in process block 503. He may send a request for another billing rule to be assigned for generation of charge amounts for a particular resource (or resource type) consumed/used by the user. This method can enable to apply a new billing rule in a next billing cycle on a basis of a cumulative resource usage volume calculated for a resource (or resource type) consumed/used in a previous billing cycle. The purpose of this procedure can be illustrated on the following example illustrating usage of a first and a second billing rule. A cumulative resource usage specification of a first billing rule specifies a total duration of phone calls made by a user being more than 60 minutes per billing cycle. A cumulative resource usage specification of a second billing rule specifies a total duration of phone calls made by a user being more than 90 minutes per billing cycle. The first billing rule specifies a telephone call price of 2 Eurocent per minute. The second billing rule specifies a telephone call price of 1 Eurocent per minute.

The method begins with process block 600. In process block 600 the invoicing system calculates a cumulative resource usage volume using the resource usage descriptions in the invoice data. All resource usage descriptions are comprised in records complying with a selection criterion assigned to a billing rule, which is used for calculation of charge amounts for each of the resource usage records used for the calculation cumulative resource usage volume. Process block 601 is executed after process block 600. In process block 601 the invoicing system selects another billing rule when the cumulative resource usage volume complies with a cumulative resource usage specification of the another billing rule. The another billing rule is assigned to another selection criterion. The same resource user type is assigned to the another selection criterion and the selection criterion. Different user types are assigned to the another selection criterion and the selection criterion. Another user type is assigned to the another selection criterion.

Turning back to the aforementioned example. The invoice data can comprise two resource usage descriptions. Each of the resource usage descriptions specifies a phone call having a duration of 40 minutes. A cumulative resource usage volume is 80 minutes. The charge amounts comprised in the invoice are generated according to the first billing rule. The cumulative resource usage volume complies with the cumulative resource sage specification assigned to the second billing rule. Thus the second billing rule is selected in process block 601. This billing rule can be used for the next billing cycle.

Execution of process blocks 601 and 600 can be triggered automatically by the invoicing system. In response to receiving of an invoice data the invoicing system can calculate a cumulative resource usage value for one or more billing rules which where used for calculation the charge amounts comprised in the invoice data. Alternatively a user can send a request to change a billing rule according to which charge amounts (related to particular resource or resource type) in his invoice are calculated.

Process block 602 is executed after process block 601 when the another billing rule is selected in process block 601. In process block 602 the invoicing system the user as to whether the user wishes to approve the another billing rule. This can be done using a user device of the user in a similar or the same way as described in process block 403. Process block 603 is executed after process block 602 when the user has approved the another billing rule. In process block 603 the invoicing system sends a request to use the another billing rule for the user. Process block 604 is executed after process block 603. In process block 604 the processing system receives the request. Afterwards it executes a reconfiguration procedure. The reconfiguration procedure causes the processing system to identify the another user type in process block 202 in response to receiving in process block 200 of a RUR from a network component having a device identification comprised in a list of device identifications assigned to the user, when a resource type identified in process block 201 using a resource usage description comprised in the received RUR is the resource type assigned to the another selection criterion assigned to the another billing rule selected in process block 601, wherein the another user type is assigned to the another selection criterion assigned to the another billing rule selected in process block 601. The reconfiguration procedure can be implemented by cancelling assignment of a user type assigned to a device identification comprised in the list and assigning the another user type assigned to the another selection criterion assigned to the another billing rule selected in process block 601 to the device identification comprised in the list.

Figure 7:
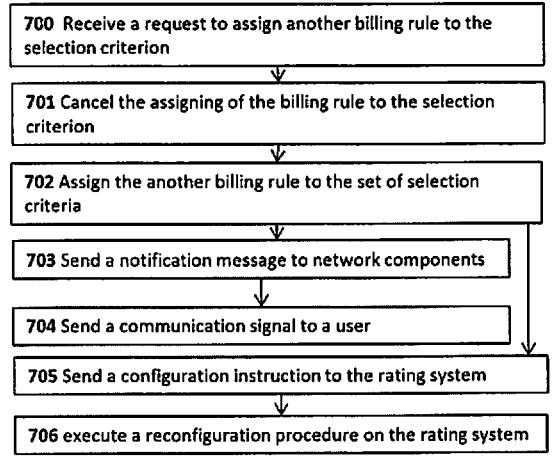
FIG. 7 shows a flowchart of an example method.

FIG. 7 depicts a flowchart of a computer-implemented method for assigning another billing rule to a selection criterion. The method begins with process block 700 in process block 700 the processing system receives a request to assign another billing rule to the selection criterion. The request can be received from a resource provider. Process block 701 is executed after process block 700. In process block 701 the processing system cancels the assignment of a billing rule to the selection criterion specified in the request. Process block 702 is executed after process block 701. In process block 702 the processing system assigns the another billing rule specified in the request to the selection criterion specified in the request. Process block 703 is executed after process block 702. In process block 703 the processing system selects records complying with the selection criterion specified in the request. Afterwards it sends a notification message to network components of the telecommunication system, each having device identification associated with the respective selected record. The notification message comprises a description of the another billing rule specified in the request. Process block 704 is executed after process block 703. In process block 704 the network component receives the notification message. Afterwards it sends a communication signal to a user. The communication signal comprises the description of the another billing rule. The communication signal can be sent to the user via a user interface of the network component and/or via a user interface of a user device of the user as described above. Process block 705 is executed after process block 702 in process block 705 the processing system sends a configuration instruction to the rating system to use the another billing rule for generation of charge amounts comprised in batch data comprising resource usage descriptions comprised in records selected according to the selection criterion. Process block 706 is executed after process block 705. In process block 706 the rating system receives the configuration instruction from the processing system. Afterwards is executes a reconfiguration procedure causing the rating system to generate charge amounts using the another billing rule in further execution of process block 303 when another batch data received from processing system comprises resource usage descriptions comprised in records selected in process block 300 according to the selection criterion specified in the request received in process block 700.

FIG. 8 depicts a flowchart of a computer-implemented method for assigning of another billing rule to a selection criterion on a basis of a cumulative resource usage volume calculated using resource usage descriptions comprised in records selected according to a selection criterion. This functionality requires assignment of a respective cumulative resource usage specification to each of at least some of the billing rules. The method begins with a process block 800 being comprised in process block 302. In process block 800 the rating system generates a cumulative resource usage volume using the resource usage descriptions comprised in the batch data received in process block 302. Process block 801 causes execution of process block 802 before execution of process block 303 when the cumulative resource usage volume does not comply with the cumulative resource usage specification assigned to the billing nine identified in process block 302. Process block 801 causes execution of process block 805 when the cumulative resource usage volume does not comply with the cumulative resource usage specification assigned to the billing rule identified in process block 302.

In process block 802 the rating system selects anther billing rule, wherein the cumulative resource usage volume complies with a cumulative resource usage specification of the another billing rule. Process block 803 is executed after process block 802. In process block 803 the rating system cancels the assigning of the billing rule identified in process block 302. Process block 804 is executed after process block 803. In process block 804 the rating system assigns the billing rule selected in process block 802 to the selection criterion. As a result thereof the charge amounts in process block 303 are generated using the billing rule selected in process block 802.

In process block 805 the rating system sends to the processing system a notification request comprising a description of the another billing rule selected in process block 802. Process block 806 is executed after process block 805. In process block 806 the processing system receives the notification request. Afterwards the processing system selects records complying with the selection criterion used in process block 300 and sends a notification message to network components of the telecommunication system, each having device identification associated with the respective selected record. The notification message comprises a description of the another billing rule selected in process block 802. In response to receiving of a notification message the network component sends a communication signal to a user. The communication signal comprises the description of the another billing rule. The sending of the communication signal can be performed in the same way as in process block 704.

FIG. 9 illustrates a computer-implemented method for initial processing of the RURs received from network components 101, 102 and generation of records in the database 130 in response to the receiving of the RURs. The network components are configured to control consumption of the resource distributed via a distribution grid 197 consisting of segments 199, 198 and to generate RURs. The RUR generated by a network component can comprise a resource consumption description of the resource delivered via the distribution grid an identification information comprising a device identification of the network component and identification data for identifying a node and/or a segment of the gird to which the network component is connected. The resource can be electricity. At least some of the network components can be smart home appliances. The distribution grid can be an electrical grid. The method begins with process block 900. In process block 900 the processing system receives a RUR from one of the network components for the resource consumed by a user. Process block 900 can be implemented in the same way as process block 200. Process block 901 is executed after process block 900. In process block 901 the processing system identifies a segment of the distribution grid and a user type by using an identification information comprised in the received RUR. Process block 901 can be implemented in the same way as process block 201 and/or 202. The user type can be the same in the method depicted on FIG. 2 and in the method depicted on FIG. 9. The segment of the distribution grid can be processed in the same way as the resource type in methods depicted on FIGS. 2-8. Process block 902 is executed after process block 901. In process block 902 the processing system generates a record in the database. The record comprises a resource consumption/usage description comprised in the received RUR and as option the identification information comprised in the received RUR. The record is associated in the database with the identified segment and the identified user type. Process block 902 can be executed in the same way as process block 902.

The records stored in the database according to method depicted on FIG. 9 can be used in any method depicted in FIGS. 3-8, wherein the segments of the gird are used as resource types.

FIG. 10 illustrates a computer-implemented method for controlling the grid/network providing resource to users using the environment described in the method depicted on FIG. 9, The method depicted on FIG. 10 begins with process block 910. In process block 910 the processing system receives a request to change a billing rule assigned to a selection criterion. The request can be received from a resource provider of the resource. The request is generated by the resource provider on a basis of monitoring availability of the resource by resource sources (or resource generation facilities) 170, 171 connected to the grid 197. When the resource is electricity, the provider can monitor electrical power deliverable by different electrical power plants such as solar cell power plants, wind mill arrays, nuclear power plants, etc. Process block 911 is executed after process block 910. In process block 911 the processing system changes the billing rule according to the request. Process block 912 is executed after process block 911. In process block 912 the processing system selects records in database according to the selection criterion. Process block 913 is executed after process block 912. In process block 913 the processing system identifies device identifications associated with the selected records or comprised in the selected records. Process block 914 is executed after process block 913. In process block 914 the processing system sends a description of the changed billing rule to network components which device identifications are identified. Process block 915 is executed after process block 914. In process block 915 one of the network components receives the description of the changed billing rule. Afterwards it adapts control of the resource consumption according to the received description. The network component 101 can be configured to manage consumption of the resource by causing a resource accumulation device 193 being connected to the same node of the distribution grid as the network component when a price of the resource according to the billing rule (or the received description of the billing rule) is below a predefined price and by causing the resource accumulation device to provide the resource as alternative to the resource provided via the gird when the price of the resource according to the billing rule (or the received description of the billing rule) is higher than another predefined price.

The methods disclosed herein are flexible. It is possible to perform various complex operations related to generation of invoices. For instance, it might be necessary to change a billing rule or user another billing rule "post-factum," i.e. after generation of invoices comprising change amounts which are generated using the an old (version) of the billing rule. Such a request can be received for instance from a resource provider or a resource provider system. When required, the processing system can generate an new billing rule by changing the old one according to the request. Afterwards process blocks 701-706 are executed. The next group of process blocks to be executed are process blocks 300-305. The selection criterion used in process block 300 for selection of the records to specifies not only parameters like a user type and a resource type which were used for generation of charge amounts using the old version of the billing rule or the old billing rule, but a time interval for selection of the records. This time interval can be provided by the resource provider which has requested a change. The time interval can be used for selection of records comprising resource usage descriptions of resources used/consumed within the time interval. Execution of process block 305 results in generation of records which comprise two charge amounts. However, the time interval can be selected such that charge amounts are generated for records comprising charge amounts which are not yet used for the generation of invoices in process block 503. For these records the charge amounts comprised therein can be substituted by the respective charge amounts generated according to the new billing rule. In this case the charge amount generated in process block 303 is not appended to the record, but it is used to substitute the charge amount appended to the record in previous execution of process block 305. In order to differentiate between these two cases, the records which contents are already used for invoice generation can be associated with a data marker. Thus the substitution of charge amounts can be limited to only records to which the data marker is not assigned. When a record does not comprise a charge amount, then execution of process block 305 results in generation of the record comprising charge amount generated according to the new billing rule.

The records comprising two charge amounts can be processed using a group of process blocks 500-503. Moreover these records can be processes in combination with the records comprising only one charge amount. The selection criterion procedure in process block 501 is modified in order to enable selection of the records comprising two charge amounts. The modified record selection procedure can enable selection of records comprising double charge amounts without restriction to the billing cycle. For instance the record selection procedure can have a special option for such records formulated as: a record to be selected has to comprise charge amounts and its identification information has to comprise any one of the device identifications of the list. The charge amounts generated for the same resource usage description and comprised in the same record can be associated with each other in the invoice data generated in process block 502. When the resource usage descriptions are comprised in the invoice data, then the charge amounts generated for the same resource usage description and comprised in the same record can be associated with the resource usage description in the invoice data. The association of the charge amounts can have a format indicating sequence of their generation.

The process block 503 can comprise an additional process for processing double charge amounts comprised in single records. Instead straightforward specifying of both charge amounts comprised in one record in an invoice, the additional process is configured to calculate their difference and specify it in the invoice. For instance when the charge amount generated last is bigger than the previously generated charge amount then a user has to pay the difference, i.e. a positive charge amount being the difference of the charge amounts is specified in the invoice. On the other hand, when the charge amount generated last is less than the previously generated charge amount then the user has to be receive back the difference, i.e. a negative charge amount being the difference of the charge amounts is specified in the invoice. The process can be configured to differentiate between single charge amounts (i.e. charge amounts originating from the records comprising only one charge amount, each) and double charge amounts (i.e. charge amounts originating from the records comprising two charge amounts, each) using association of the charge amounts in the invoice data. The process can specify a charge amount in the invoice when that charge amount does not have an associated charge amount in the invoice data, and specify a differential charge amount in the invoice for the associated charge amounts, wherein the differential charge amount is equal to one of the associated charge amounts minus another one of the associated charge amounts, wherein the one of the associated charge amounts is generated after the another one of the associated charge amounts.

The preceding figures and accompanying description illustrate the example processes and computer implementable techniques. But example environment (or their software or other components) contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, the example environment may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "control system" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto optical disks; and CD ROM, DVD+/-R, DVI)-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

The "electronic user interface" may be a "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any implementation or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some causes be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

The invention claimed is:

1. A network database system comprising;
    a rating system;
    a processing system, the processing system including a database; and
    a network component configured to generate resource usage records, (RURs), each of the RURs comprising a resource usage description of usage of one of resources and device identification information indicating the device identification of a corresponding network component,
    at least one network;
    the rating system, the processing system, and the network component each connected to the at least one network, and each configured to communicate with each other via the at least one network;
    the database being configured to store a plurality of records, and
    the processing system being configured to perform:
    receiving a RUR from the network component for a resource provided to a user,
    identifying a resource type of the resource by using the resource usage description comprised in the received RUR,
    identifying a user type associated with the user by using the device identification information comprised in the received RUR,
    generating a record in the database, the record comprising the resource usage description comprised in the received RUR, the device identification information comprised in the received RUR, the record being associated with the identified resource type and the identified user type,
    selecting a plurality of records stored in the database according to a selection criterion specifying that the plurality of records to be selected is associated with a resource type assigned to that selection criterion and a user type assigned to that selection criterion, and
    sending batch data to the rating system, the batch data comprising a plurality resource usage descriptions included in the respective plurality of selected records, and
    wherein, in response to receiving of the batch data from the processing system, the rating system is configured to perform:
    generating a charge amount for each of the resource usage descriptions comprised in the batch data, and
    sending a billing data to the processing system, the billing data comprising the charge amounts.

2. The network database system of claim 1, wherein the rating system is configured to generate charge amounts for resource usage description comprised in batch data according to billing rules,
    wherein each of the billing rules is assigned to a respective selection criterion of a set of selection criteria comprising the selection criterion,
    wherein, in response to receiving of the batch data from the processing system, the rating system is configured to perform:
    identifying a billing rule assigned to the selection criterion, and
    wherein the generating of the charge amount for each of the resource usage descriptions comprised in the batch data is executed according to the identified billing rule.

3. The network database system of claim 1, wherein the rating system is configured to generate charge amounts for resource usage descriptions comprised in batch data according to billing rules each having a resource usage specification, wherein each of the billing rules is assigned to a respective selection criterion of a set of selection criteria comprising the selection criterion, wherein the resource type assigned to the selection criterion is the identified resource type and the user type assigned to the selection criterion is the identified user type, wherein the rating system is configured to perform the following in response to receiving the of batch data from the processing system:
    identifying a billing rule assigned to said selection criterion, wherein the generating of the charge amount for each of the resource usage descriptions comprised in the batch data is executed according to the identified billing rule,
    wherein, in response to receiving the batch data from the processing system, the rating system is configured to perform:
    selecting another billing rule when the resource usage description comprised in the received RUR does not comply with a resource usage specification of the identified billing rule and complies with a resource usage specification of the another billing rules, wherein the another billing rule is assigned to another selection criterion, wherein another user type and the identified resource type are assigned to the another selection criterion,
    sending to the processing system a notification request comprising a description of the another billing rule, the processing system being configured to perform the following in response to receiving the notification request:
    sending to the network component a notification message comprising the description of the another billing rule,
    wherein, in response to receiving of the notification message, the network component is configured to perform:

prompting the user as to whether the user wishes to approve the another billing rule, sending to the processing system a response message indicating that the user has approved the another billing rule, when the user has approved the another billing rule, and wherein, in response to receiving of the response message, the processing component is configured to perform:

executing a reconfiguration procedure causing the processing system to identify the another user type in further execution of the identifying of the user type of the user by using the device identification information comprised in another received RUR, when the another received RUR is received from the network component for the resource provided to the user.

4. The network database system of claim 1, wherein the selection criterion specifies that a record to be selected comprises a resource usage description for which the charge amount is not yet generated, and/or wherein the selecting of the records in the database and the sending of the batch data to the rating system is executed according to a schedule and/or when an overall number of records in the database complying with the selection criterion is bigger than a predefined value, and/or wherein the selection criterion specifies a predefined time interval in which a resource specified in a resource usage description comprised in a record to be selected is used.

5. The network database system of claim 1, wherein, in response to receiving of the billing data from the rating system, the processing system being configured to perform:

appending each of the charge amounts to the respective record comprising the resource usage description for which the each of the charge amounts is generated, wherein the network database system further comprises an invoicing system being configured to perform the following at an end of a billing cycle assigned to the user:

sending to the processing system an invoice data request comprising a record selection criterion assigned to the user and the billing cycle, wherein, in response to receiving of the invoice data request, the processing system being configured to perform:

selecting other records in the database each comprising the device identification information complying with the record selection criterion, a charge amount, and a resource usage description indicating that a resource used according to that resource usage description is used during the billing cycle, sending invoice data to the invoicing system, the invoice data comprising charge amounts, each comprised in the respective another record, and wherein, in response to receiving of the invoice data, the invoicing system is configured to perform:

generating an invoice using the invoice data.

6. The network database system of claim 5, wherein the generating of the charge amount for each of the resource usage descriptions comprised in the batch data is executed according to a billing rule assigned to the selection criterion, wherein the processing system is configured to perform the following in response to receiving the invoice data request:

associating each of the other records with a data marker indicating that the charge amount comprised in the each of the other records is used for invoicing, wherein, in response to receiving of a request to assign another billing rule to the selection criterion, the processing system is configured to perform:

cancelling the assigning of the billing rule to the selection criterion, assigning the another billing rule to the selection criterion, repeating the selecting of records in the database according to the selection criterion, and sending another batch data to the rating system, the another batch data comprising resource usage descriptions, each comprised in the record selected in the repeating of the selecting of the records in the database according to the selection criterion, wherein, in response to receiving of the another batch data from the processing system, the rating system is configured to perform:

generating a charge amount for each of the resource usage descriptions comprised in the another batch data using the another billing rule, and sending another billing data to the processing system, the billing data comprising the charge amounts generated in the generating of the charge amount for each of the resource usage descriptions comprised in the another batch data, and wherein, in response to receiving of the another billing data from the rating system, the processing system is configured to perform:

appending each of the charge amounts comprised in the another billing data to the respective record comprising the resource usage description for which the each of the charge amounts comprised in the another billing data is generated when the respective record comprising the resource usage description for which the each of the charge amounts comprised in the another billing data is generated does not comprise the charge amount or the respective record comprising the resource usage description for which the each of the charge amounts comprised in the another billing data is generated is associated with the data marker, otherwise substituting a charge amount comprised in the respective record comprising the resource usage description for which the each of the charge amounts comprised in the another billing data is generated by the each of the charge amounts comprised in the another billing data.

7. The network database system of claim 6, wherein at an end of another billing cycle assigned to the user, the invoicing system is configured to perform:

sending to the processing system another invoice data request comprising the record selection criterion and the another billing cycle, wherein, in response to receiving of the invoice data request, the processing system being configured to perform:

selecting other records in the database each comprising either the device identification information complying with the record selection criterion, only one charge amount, and a resource usage description indicating that a resource used according to that resource usage description is used during the another billing cycle or the device identification information complying with the record selection criterion and charge amounts, and sending another invoice data to the invoicing system, the invoice data comprising charge amounts each comprised in the respective another record selected in the selecting of the other records in the database each comprising either the device identification information complying with the record selection criterion, only one charge amount, and the resource usage description indicating that the resource used according to that resource usage description is used during the another billing cycle or the device identification information complying with the record selection criterion and the charge amounts, wherein the charge amounts comprised in the same record are associated with each other in the another invoice data, wherein, in response to receiving of the another invoice data, the invoicing system is configured to perform:

generating another invoice using the another invoice data, wherein the generating of the another invoice using the another invoice data comprises:

specifying a charge amount in the another invoice when that charge amount does not have an associated charge amount in the another invoice data, and specifying a differential charge amount in the another invoice for the associated charge amounts, wherein the differential charge amount is equal to one of the associated charge amounts minus another one of the associated charge amounts, wherein the one of the associated charge amounts is generated after the another one of the associated charge amounts.

8. The network database system of claim 5, wherein the network database system comprises a resource provider system configured to generate RURs related to basic fees for providing access to the resource for the user, wherein the resource provider is configured to perform:

sending another RUR to the processing system, the another RUR comprising an device identification information and a resource usage description, the device identification information comprised in the another RUR comprising the device identification of the network component, the resource usage description comprised in the another RUR comprising a basic fee for providing access to the resource and a description of the resource, and wherein the processing system is configured to perform:

receiving the another RUR from the resource provider system, identifying a resource type of the resource by using the resource usage description comprised in the another RUR, identifying a user type of the user by using the identification information comprised in the another RUR, and generating another record in the database, the another generated record comprising the resource usage description comprised in the another RUR, the device identification information comprised in the another RUR, a charge amount being equal to the basic fee comprised in the resource usage description comprised in the another RUR, the another record being associated with the resource type identified in the identifying of resource type of the resource by using the resource usage description comprised in the another RUR and the user type identified in the identifying of the user type of the user by using the device identification information comprised in the another RUR.

9. The network database system of claim 5, wherein the device identification information of the received RUR comprises a device identification of the network component, wherein the record generated in the database is assigned to the device identification, wherein the record selection criterion comprises a list of device identifications, and wherein the record selection criterion specifies that an device identification information of a record to be selected comprises any one of the device identifications of the list.

10. The network database system of claim 5, wherein the rating system is configured to generate charge amounts for resource usage descriptions comprised in batch data according to billing rules each having a cumulative resource usage specification, wherein each of the billing rules is assigned to a respective selection criterion of a set of selection criteria comprising the selection criterion, wherein the rating system is configured to perform identifying a billing rule assigned to said selection criterion in response to receiving of the batch data from the processing system, wherein the generating of the charge amount for each of the resource usage descriptions comprised in the batch data is executed according to the identified billing rule, wherein the invoice data comprises resource usage descriptions, each comprised in the respective another record, wherein the invoicing system is configured to perform:

calculating a cumulative resource usage volume of the resource using the resource usage descriptions in the invoice data each having the respective charge amount generated using the identified billing rule, selecting another billing rule when the cumulative resource usage volume complies with a cumulative resource usage specification of the another rule, wherein the another billing rule is assigned to another selection criterion, wherein another user type and the identified resource type are assigned to the another selection criterion, prompting the user as to whether the user wishes to approve the another bulling rule, sending to the processing system a request to use the another billing rule for the user when the user has approved the another billing rule, and wherein, in response to receiving of the request to use the another billing rules for the user, the processing system is configured to perform:

executing a reconfiguration procedure causing the processing system to identify the another user type in further execution of the identifying of a user type of a user by using an device identification information comprised in another received RUR, when the another received RUR is received for the resource provided to the user from any of the network components having a device identification comprised in the list of device identifications.

11. The network database system of claim 1, wherein the device identification information of the received RUR comprises a device identification of the network component, wherein the record generated in the database is associated with the device identification, wherein the generating of the charge amount for each of the resource usage descriptions comprised in the batch data is executed according to a billing rule assigned to the selection criterion, and wherein the processing system is configured to perform the following in response to receiving of a request to assign another billing rule to the selection criterion:

cancelling the assigning of the billing rule to the selection criterion, assigning the another billing rule to the selection criterion, sending a notification message to network components of the network database system, each having device identification associated with the respective selected record, the notification message comprises a description of the another billing rule.

12. The network database system of claim 11, wherein the request to assign the another billing rule to said selection criterion is received from a resource provider, and/or
wherein, in response to receiving of the notification message, a network component of the network database system is configured to perform:
sending a communication signal to a user, the communication signal comprises the description of the another billing rule.

13. The network database system of claim 11, wherein the processing system is configured to perform the following in response to receiving of the request to assign the another billing rule to said selection criterion:
sending a configuration instruction to the rating system to use the another billing rule for generation of charge amounts comprised in batch data comprising resource usage descriptions comprised in records selected according to the selection criterion, and
wherein the rating system is configured to perform the following in response to receiving of the configuration instruction:
executing a reconfiguration procedure causing the rating system to generate charge amounts using the another billing rule in further execution of the generating of a charge amount for each of resource usage descriptions comprised in another received batch data when the another received data comprises resource usage descriptions comprised in records selected according to the selection criterion.

14. The network database system of claim 1, wherein the rating system is configured to generate charge amounts for resource usage descriptions comprised in batch data according to billing rules each having a cumulative resource usage specification,
wherein each of the billing rules is assigned to a respective selection criterion of a set of selection criteria comprising the selection criterion, and
wherein, in response to receiving of the batch data from the processing system, the rating system is configured to perform:
calculating a cumulative resource usage volume using the batch data,
preforming the following when the cumulative resource usage volume does not comply with a cumulative resource usage specification of a billing rule assigned to the selection criterion:
selecting anther billing rule, wherein the cumulative resource usage volume complies with a cumulative resource usage specification of the another billing rule,
cancelling the assigning of the billing rule to the selection criterion,
assigning the another billing rule to the selection criterion,
wherein the charge amounts in the generating of the charge amount for the each of the resource usage descriptions comprised in the batch data are generated using the another billing rule when the cumulative resource usage volume complies with the cumulative resource usage specification of the another billing rule,
wherein the charge amounts in the generating of the charge amount for the each of the resource usage descriptions comprised in the batch data are generated using the billing rule when the cumulative resource usage volume complies with the cumulative resource usage specification of the billing rule.

15. The network database system of claim 14, wherein the device identification information of the received RUR comprises a device identification of the network component,
wherein the record generated in the database is associated with the device identification,
wherein, in response to receiving of the batch data from the processing system, the rating system is configured to perform:
sending to the processing system a notification request comprising a description of the another billing rule when the cumulative resource usage volume does not comply with the cumulative resource usage specification of the billing rule assigned to the selection criterion, and
wherein, in response to receiving of the notification request, the processing system is configured to perform:
sending a notification message to network components of the network database system, each having device identification assigned to the respective selected record, the notification message comprising the description of the another billing rule.

16. A telecommunication system for controlling a distribution of a resource via a distribution grid consisting of segments, the telecommunication system comprising a rating system, a processing system, a database, and network components configured to control consumption of the resource and to generate resource usage records, (RURs), wherein each RUR comprises a resource consumption description of the resource delivered via the distribution grid and device identification information comprising a device identification of a network component which has generated the each RUR, the processing system being configured to perform the following steps:
receiving a RUR from one of the network components for the resource consumed by a user,
identifying a segment of the distribution grid and a user type of the user by using an the device identification information comprised in the received RUR,
generating a record in a database, the record comprising a resource consumption description comprised in the received RUR and the device identification information comprised in the received RUR, the record being associated with the identified segment and the identified user type;
wherein the rating system is configured to generate charge amounts for resource usage consumption descriptions comprised in records complying with a selection criterion specifying that a record to be selected has the identified user type and the identified segment, wherein the processing system is configured to perform the following steps in response to receiving of a request to change the billing rule:
changing the billing rule according to the request,
selecting records according to the selection criterion,
identifying device identifications comprised in the selected records,
sending a description of the changed billing rule to network components which device identifications are identified,
wherein at least one of the network components is configured to perform the following in response to receiving of the description:
adapting control of the resource consumption according to the received description.

17. The telecommunication system of claim 16, wherein the request is received from a resource provider of the resource, wherein the request is generated by the resource provider on a basis of monitoring availability of the resource by resource sources connected to the grid.

18. The telecommunication system of claim 16, wherein the at least one of the network component is configured to manage consumption of the resource by causing a resource accumulation device being connected to the same node of the distribution grid as the at least one of the network components when a price of the resource according to the billing rule is below a predefined price and by causing the resource accumulation device to provide the resource as alternative to the resource provided via the gird when the price of the resource according to the billing rule is higher than another predefined price.

19. The telecommunication system of claim 16, wherein the resource is electricity and/or the at least one of the network components is a smart home appliance.

20. A computer-implemented method for processing of resource usage records, RURs, in a network database system comprising a rating system a processing system including a database, and a network component configured to generate the RURs, the rating system, the processing system, and the network component each connected to at least one network, and each configured to communicate with each other via the at least one network each of the RURs comprising a resource usage description of usage of one of resources and a device identification information, the method comprising:

receiving a RUR from the network component for a resource provided to a user, identifying a resource type of the resource by using a resource usage description comprised in the received RUR, identifying a user type of the user by using the device identification information comprised in the received RUR, generating a record in the database, the record comprising the resource usage description comprised in the received RUR, device identification information comprised in the received RUR, the record being associated with the identified resource type and the identified user type, selecting a plurality of records in the database, each of the selected records complying with a selection criterion specifying that a record to be selected is associated with a resource type assigned to the selection criterion and a user type assigned to the selection criterion, and sending batch data to the rating system, the batch data comprising a plurality of resource usage descriptions, each included in the respective selected record of the plurality of selected records, and wherein, in response to receiving of the batch data from the processing system the rating system performs:

generating a charge amount for each of the resource usage descriptions comprised in the batch data, and sending a billing data to the processing system, the billing data comprising the charge amounts.

* * * * *